(12) United States Patent
Zigmond et al.

(10) Patent No.: US 6,966,066 B1
(45) Date of Patent: *Nov. 15, 2005

(54) INTERACTIVE TELEVISION RECEIVER UNIT BROWSER THAT WAITS TO SEND REQUESTS

(75) Inventors: Daniel J. Zigmond, Carnation, WA (US); Dean J. Blackketter, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 763 days.

This patent is subject to a terminal disclaimer.

(21) Appl. No.: 10/029,055

(22) Filed: Oct. 25, 2001

Related U.S. Application Data

(63) Continuation of application No. 09/345,251, filed on Jun. 30, 1999, now Pat. No. 6,330,719.

(51) Int. Cl.[7] .................. H04N 7/173; H04N 5/445; G06F 3/00; G06F 13/00
(52) U.S. Cl. ................. 725/121; 725/96; 725/97; 725/60
(58) Field of Search ............... 725/60, 96–97, 725/121; 709/207, 217–229; 370/234

(56) References Cited

U.S. PATENT DOCUMENTS

| | | | |
|---|---|---|---|
| 4,566,030 A | | 1/1986 | Nickerson et al. ............ 358/84 |
| 5,623,603 A | * | 4/1997 | Jiang et al. .................. 709/207 |
| 5,774,660 A | | 6/1998 | Brendel et al. ......... 395/200.31 |
| 5,799,002 A | * | 8/1998 | Krishnan .................... 370/234 |
| 5,818,441 A | | 10/1998 | Throckmorton et al. .... 345/328 |
| 5,818,935 A | | 10/1998 | Maa ............................ 380/20 |
| 5,826,242 A | | 10/1998 | Montulli ..................... 705/27 |
| 5,832,223 A | | 11/1998 | Hara et al. ............. 395/200.47 |
| 5,864,823 A | | 1/1999 | Levitan ....................... 105/14 |
| 5,961,601 A | | 10/1999 | Iyengar ....................... 709/229 |
| 5,961,602 A | | 10/1999 | Thompson et al. ......... 709/229 |
| 5,963,915 A | | 10/1999 | Kirsch ......................... 705/26 |

(Continued)

OTHER PUBLICATIONS

Advanced Television Enhancement Forum (ATVEF); Copyright ATVEF, 1998, 1999, All Rights Reserved. Draft, Version 1.1r26 updated Feb. 2, 1999.

*Primary Examiner*—Hai Tran
(74) *Attorney, Agent, or Firm*—Workman Nydegger

(57) ABSTRACT

In interactive television, a broadcaster may broadcast triggers to a great many receiver units prompting the receiver units to attempt to send requests to a single destination on the Internet at roughly the same time. Such a large number of simultaneous requests can give rise to throughput problems and server overload. A receiver unit in accordance with the invention, rather than immediately attempting to send a request, waits a period of time (for example, a random period) before sending the request so as not to overload the server. In one embodiment, a trigger is received on an interactive television receiver unit prompting the viewer to select an icon. If the viewer selects the icon, then a browser in the receiver unit retrieves a web page on the Internet identified by a URL in the trigger. The web page includes an indication of a destination, scheduling information, and a form area. The viewer enters user information in association with the form area. The browser captures that user information, incorporates it into a request, and then stores the request in a queue along with the scheduling information. The browser periodically checks the scheduling information in the queue and determines from the scheduling information if it is time to send the request. When the browser determines the time has come to send a request in the queue, the browser retrieves the request and sends it to the destination. The browser may then receive a return response and display it.

33 Claims, 4 Drawing Sheets

U.S. PATENT DOCUMENTS

| | | | |
|---|---|---|---|
| 6,023,726 A | 2/2000 | Saksena | 709/219 |
| 6,035,324 A | 3/2000 | Chang et al. | 709/203 |
| 6,055,564 A * | 4/2000 | Phaal | 709/207 |
| 6,134,379 A | 10/2000 | LaMacchia | 386/54 |
| 6,330,719 B1 * | 12/2001 | Zigmond et al. | 725/121 |
| 6,742,016 B1 * | 5/2004 | Bhoj et al. | 709/207 |

* cited by examiner

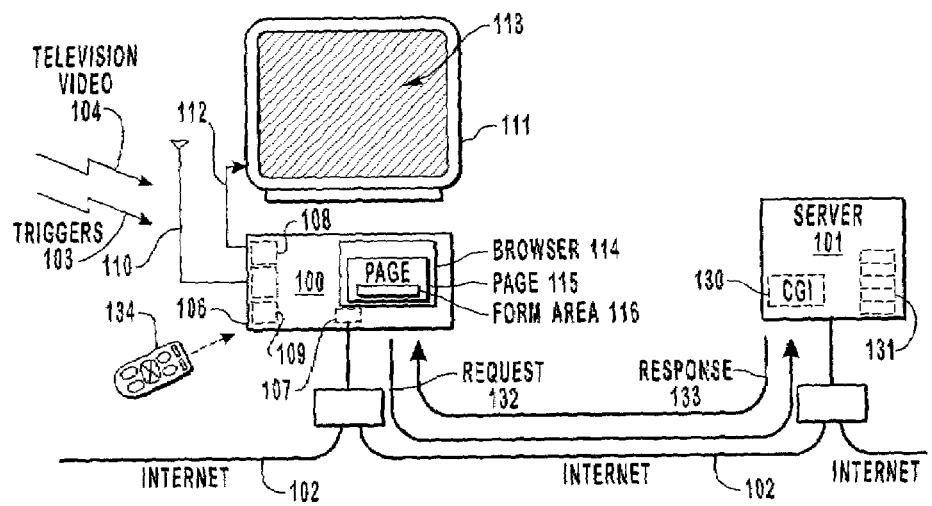
FIG. 1
(PRIOR ART)
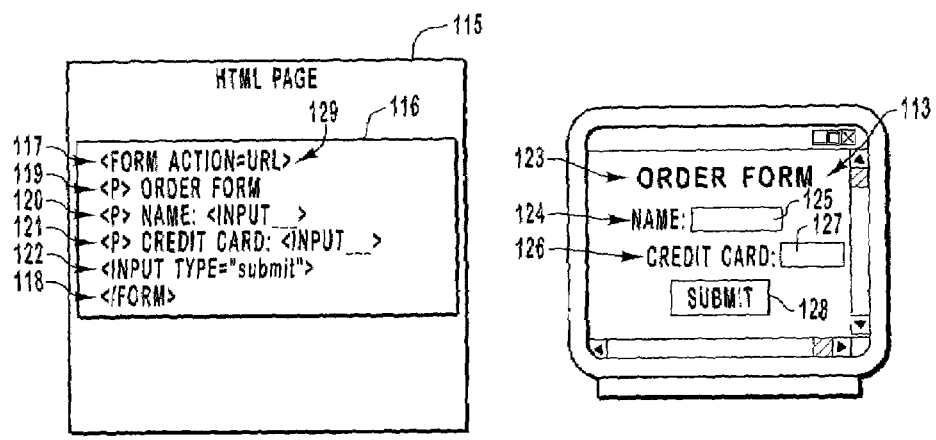
FIG. 2
(PRIOR ART)
FIG. 3
(PRIOR ART)

INTERACTIVE TELEVISION RECEIVER UNIT BROWSER THAT WAITS TO SEND REQUESTS

RELATED APPLICATIONS

This application is a continuation of U.S. patent application Ser. No. 09/345,251, filed Jun. 30, 1999, now U.S. Pat. No. 6,330,719 entitled, "Interactive Television Receiver Unit Browser That Waits to Send Requests," which is hereby incorporated by reference.

BACKGROUND OF THE INVENTION

Background and Related Art

FIG. 1 (Prior Art) is a diagram of an interactive television receiver unit 100 that is coupled to a server 101 via a packet-switched network such as the Internet 102. "Triggers" 103 are broadcast along with television video 104 so that viewers can view appropriate web content along with television video at appropriate points in the television video.

One example of such an interactive television receiver unit 100 is a WebTV® Internet Terminal available from WebTV Networks, Inc., of Mountain View, Calif. In the illustrated example, receiver unit 100 includes a television tuner and receiver 106, a modem 107, an audio digital-to-analog converter (DAC) and video encoder 108, and an infrared interface 109. Receiver unit 100 receives triggers 103 and television video 104 via an antenna 110 and the television tuner and receiver 106. Receiver unit 100 is coupled to the Internet 102 via modem 107. Receiver unit 100 is coupled to an ordinary analog television 111 via audio DAC and video encoder 108 and a video link 112 so that receiver unit 100 can use the television screen 113 of television 111 as a display device. A viewer interacts with receiver unit 100 via an infrared remote control unit 134 that is coupled to receiver unit 100 via the infrared interface 109.

A viewer can receive an advertisement for an item and can use receiver unit 100 to order the item as follows. At an appropriate point in the television video, a trigger 103 is broadcast along with the broadcast television video 104. The trigger 103 is received on antenna 110 and causes browser software 114 to display an icon (not shown) on screen 113 along with the television video. The icon queries the user if the user wants to purchase the item. If the viewer selects the icon using the handheld remote control unit 134, then browser 114 uses a Uniform Resource Locator (URL) from the trigger 103 to retrieve an identified order form web page 115. In the illustrated example, the identified order form web page 115 is retrieved from a merchant's server 101 via the Internet 102.

FIG. 2 (Prior Art) depicts hypertext markup language (HTML) code of web page 115. Web page 115 includes a form area 116 defined by a beginning form tag <FORM> 117 and an ending form tag <FORM> 118. Within this form area 116, there are four lines 119–122 of HTML code. Browser 114 of receiver unit 100 renders the first line 119 by displaying the text "ORDER FORM" on the screen of the receiver unit. FIG. 3 illustrates the text "ORDER FORM" 123 displayed on the viewer's screen 113.

Browser 114 renders the second line 120 by displaying the text "NAME:" 124 on screen 113 and records information entered by the user in a designated space 125 on screen 113. Similarly, browser 114 renders the third line 121 by displaying the text "CREDIT CARD:" 126 on screen 113 and records information entered by the user in a designated space 127 on screen 113. Browser 114 renders the fourth line 122 by displaying a "SUBMIT" button 128 on screen 113. When the viewer selects the submit button 128 using the handheld remote control unit 134, browser 114 sends the recorded information from spaces 125 and 127 to a destination identified by a URL 129 of the form tag 117.

In the illustrated example, URL 129 identifies a particular file on server 101 that contains a Common Gateway Interface (CGI) program 130 and a database 131. CGI program 130 can be written in any one of a number of suitable languages including C++ and scripting languages. The name and credit card information from fields 125 and 127 is sent in the form of an HTTP request 132 from receiver unit 100 to the CGI program 130. When HTTP request 132 is received, server 101 sends an HTTP response 133 having an HTTP status code back to receiver unit 100. If HTTP request 132 was properly received, then CGI program 130 writes the name and credit card information into data base 131 and sends a "110 OK" status code back to the receiver unit 100 indicating that the request was received properly. The merchant who sells the item can then access data base 131, identify the order to be filled, and fill the order.

The use of such a broadcast trigger may, however, lead to problems. Triggers broadcast along with television video are typically received by a great many receiver units all at roughly the same time. As a result, many receiver units may attempt to access the same web page and order form resources at the same time. Throughput bottlenecks and overloading at the server may result. Accordingly, many potential customers may not be able to access the order form during the overloading period, thereby preventing the ordering of the item, and leading to lost sales. A solution is desired.

SUMMARY

Rather than immediately attempting to send a request, an interactive television receiver unit browser waits a period of time (for example, a random period) before sending the request to the server. By backing off the sending of requests, accessing of the server can be smoothed out over time.

In one embodiment, a trigger is received on an interactive television receiver unit causing an icon to be displayed on the receiver unit. If the viewer selects the icon, then a browser in the receiver unit retrieves a web page on the Internet identified by a Uniform Resource Locator (URL) in the trigger. The web page includes an indication of a destination, scheduling information, and a form area. The viewer enters user information in association with the form area. The browser captures that user information, incorporates it into a request, and then stores the request in a queue along with the scheduling information. The browser periodically checks the scheduling information in the queue and determines from the scheduling information if it is time to send the request. When the browser determines the time has come to send a request in the queue, the browser retrieves the request and sends it to the destination. Because the scheduling information and destination is under the control of the web page author, the web page author can vary scheduling information from access to access so that return requests from receiver units are spread out over time, thereby reducing or eliminating problems associated with simultaneously sending large numbers of requests to the same destination.

In addition to being usable to eliminate throughput bottlenecks by spreading accesses of a destination out over time, the invention is also usable to move accessing of a destination to a desired time slot. In some situations is it more economical to send responses to a destination at some times than at other times. Sending responses to the destination during low usage times during the night is often less expensive than sending the same responses during relatively high usage times in the middle of the workday. A receiver unit in accordance with one embodiment of the invention takes advantage of the lower cost of low usage times by deferring requests and waiting until the low usage times to send the requests to the destination.

In accordance with another embodiment, a service provider provides a new tier of interactive television service in which receiver units can only connect at off-peak times to send responses (and perhaps to exchange email, collect television listings data, and other non-real-time functions). Being able to control when requests are sent makes it possible to provide interactive television services to a new class of customer who wants to be able to subscribe to publications and take part in polls associated with television programming, but who is not willing or able to pay for a full Internet subscription. In one embodiment, a service option is provided whereby a receiver unit can use email (sent and received at night rather than on demand) and can send deferred responses (sent at night rather than on demand). Accordingly, a service provider provides a first more expensive tier of service involving a full Internet subscription, as well as a second less expensive tier of service wherein requests are deferred and sent during less expensive off-peak times. In the second tier of service, the transaction appears to be complete to the user without making the user wait for a dial-up connection to be established. The user experience of the second tier of service is improved by making the transaction appear complete to the user even though the response has not actually been sent.

Other aspects of the invention and other embodiments are described in the detailed description below. This summary does not purport to define the invention. The invention is defined by the claims.

BRIEF DESCRIPTION OF THE DRAWINGS

FIG. 1 (Prior Art) is a simplified diagram of an interactive television receiver unit usable to order an item in response to a broadcast trigger.

FIG. 2 (Prior Art) is a simplified diagram of a web page containing an order form area.

FIG. 3 (Prior Art) is a simplified diagram of the screen of the receiver unit of FIG. 1.

DETAILED DESCRIPTION

Figure 4:
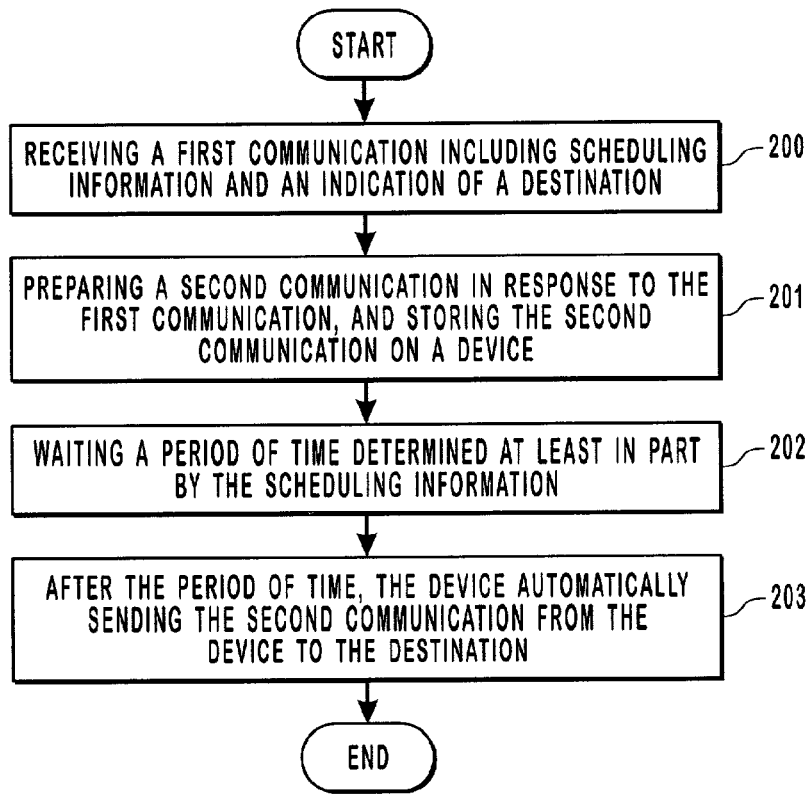
FIG. 4 is a flowchart of a method in accordance with an embodiment of the present invention.

FIG. 4 is a flowchart of a method in accordance with one embodiment of the present invention. In a first step (step 200), a receiver unit receives a first communication. The first communication received at the receiver unit includes an indication of a destination, and scheduling information. In one embodiment: 1) the first communication is a script that generates Hypertext Markup Language (HTML) that is displayed on the receiver unit as an order form web page, 2) the indication of a destination is a Uniform Resource Locator (URL) that identifies a Common Gateway Interface (CGI) program on a server, and 3) the scheduling information is an indication of an amount of time for the receiver unit to wait before sending a second communication to the destination in response.

The first communication can be communicated to the receiver unit via any of a number of suitable communication mediums including one-way terrestrial broadcast communication over the airwaves, communication over a packet-switched network, and communication over a cable. The first communication can be communicated via numerous different types of communication channels including television channels and digital radio channels. The first communication may be a script that is received by the receiver unit as part of a broadcast trigger or as part of a web page or as an attachment to a web page.

Next (step 201), a response to the first communication is prepared and is stored on the receiver unit. In an embodiment where the first communication is a script that executes on the receiver unit, the second communication is an HTTP request. The user interacts with an order form web page and enters certain information. The script takes this information and encodes it to generate the HTTP request.

Rather than immediately attempting to send the second communication, the receiver unit waits (step 202) a period of time determined by the scheduling information. After the period of time has expired, the receiver unit automatically sends (step 203) the second communication to the destination. In one embodiment where the response is an HTTP request containing user-entered information and where the destination is an address of a CGI script on a server, the CGI script on the server receives the user-entered information and updates a database with the user-entered information.

In an embodiment where a broadcast trigger would otherwise prompt numerous accesses of a single information resource on the Internet and thereby cause throughput bottlenecks and/or other information resource accessing problems, the method of FIG. 4 is usable to spread out over time the accessing of the information resource so that the throughput bottlenecks and/or other information resource accessing problems are diminished or eliminated. In such a situation, the scheduling information may be an indication that the second communication is to be sent in response after a random backoff amount of time has expired. Because the scheduling information in the trigger is under the control of the author of the first communication (for example, a merchant selling an item), the author is able to tailor the scheduling information to improve access to a destination or information resource controlled by the author.

Figure 6:
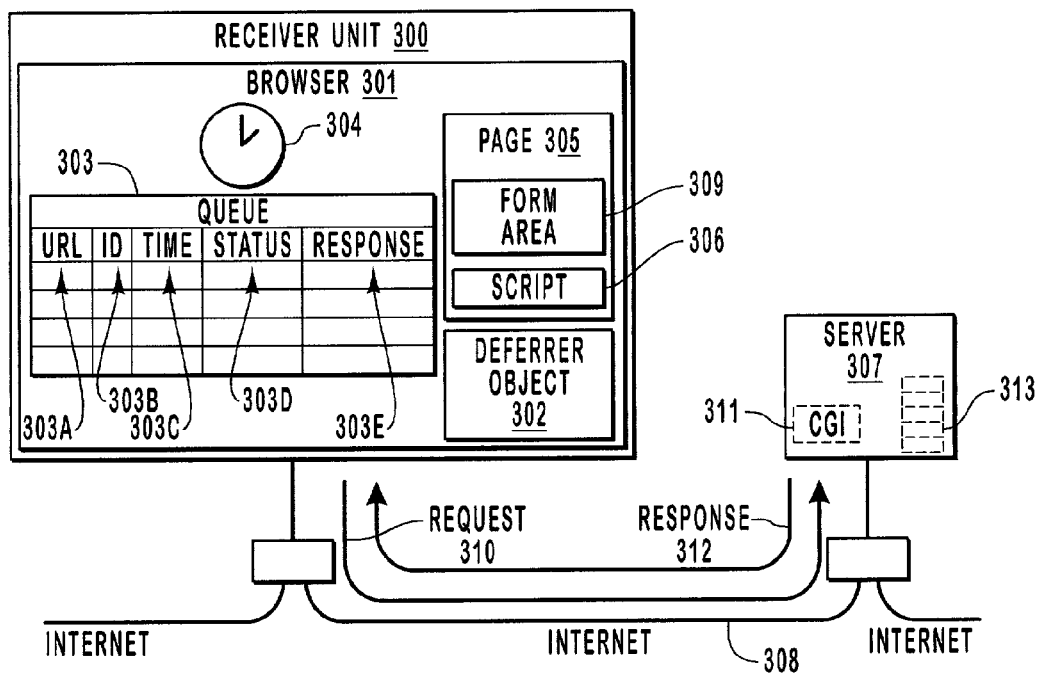
FIG. 6 is a simplified diagram of a receiver unit carrying out the method of FIG. 5.
Figure 5A:
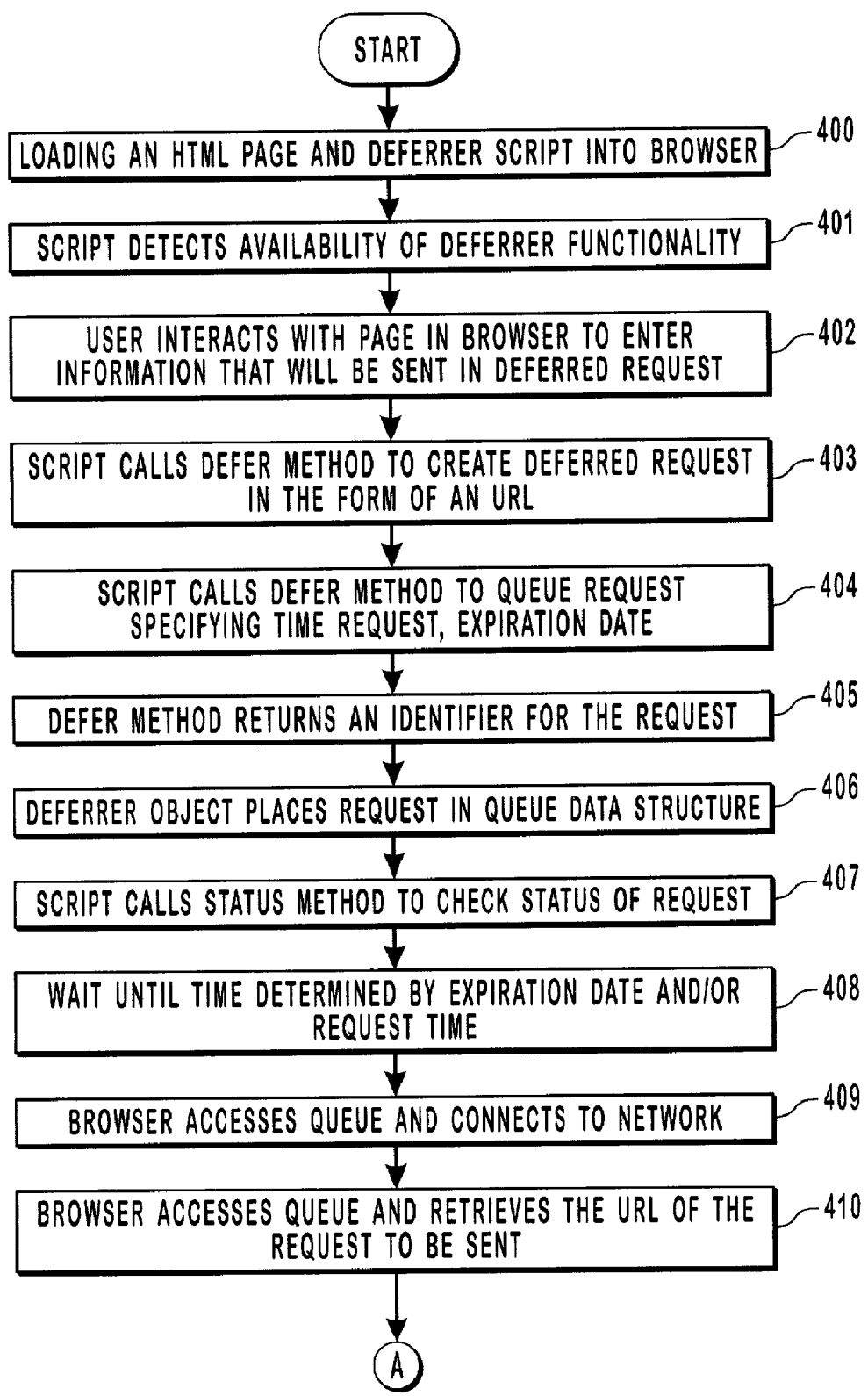
FIG. 5 is a flowchart of a method in accordance with another embodiment of the present invention.
Figure 5B:
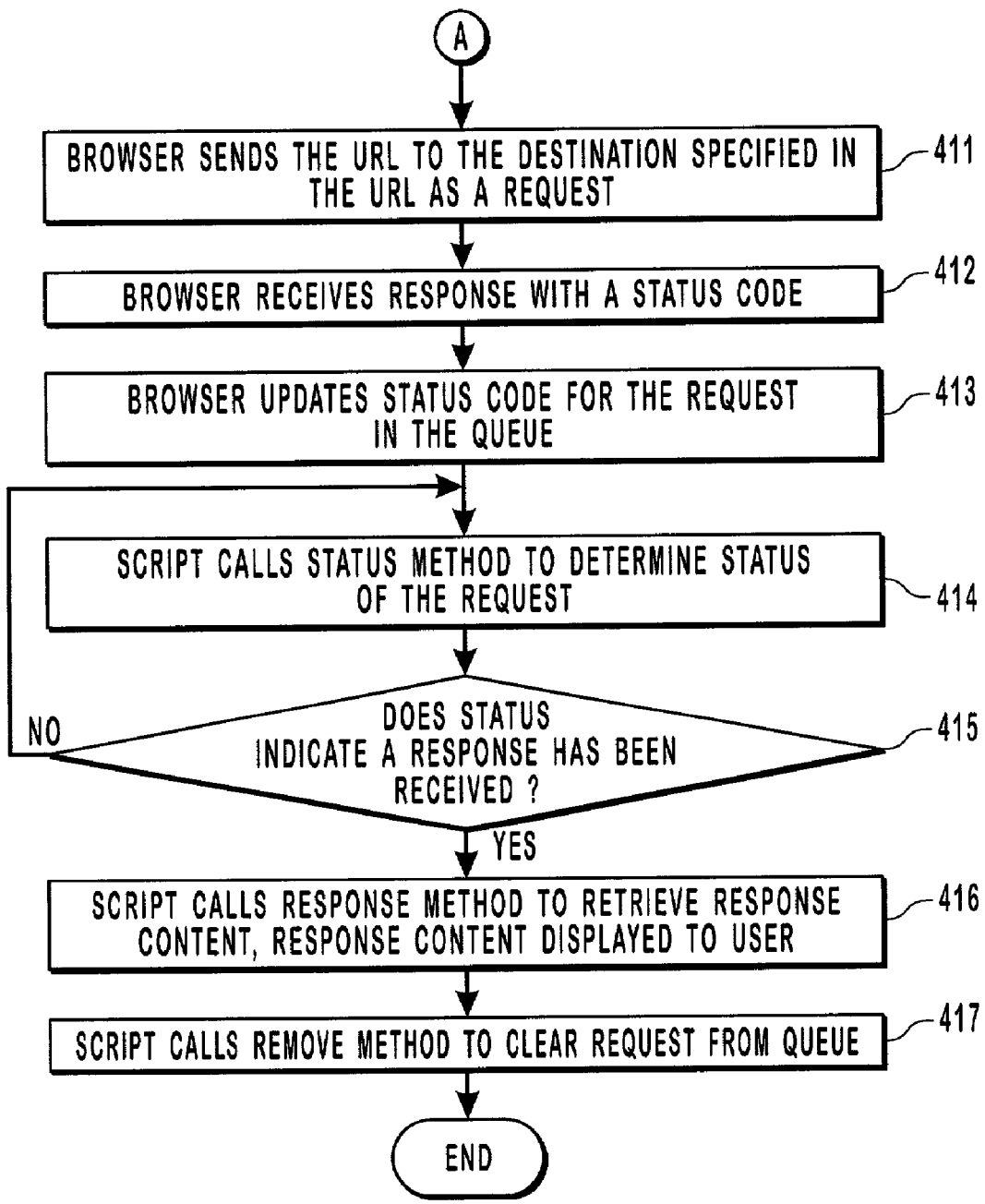

FIG. 5 is a flowchart of another method in accordance with the present invention. FIG. 6 is a diagram of a receiver unit 300 that carries out the method of FIG. 5. In one embodiment, receiver unit 300 is a WebTV® Internet Terminal set-top box as described in U.S. patent application Ser. Nos. 09/295,746 and 09/295,436 (the entire contents of these two applications is incorporated herein by reference). Receiver unit 300 includes an antenna and/or other means of receiving broadcast video and triggers, a television tuner and receiver, an infrared remote control unit, an infrared interface for communicating with the infrared remote control unit, an audio digital-to-analog converter (DAC) and video encoder and video link for driving a television and for using the television's screen as a display device, and a modem for coupling to a packet-switched network (for example, the Internet) as illustrated and described in connection with FIG. 1. This detail is omitted from FIG. 6 to clarify the illustration.

In accordance with the method of FIG. 5, browser software 301 in receiver unit 300 includes an instance of a deferrer object 302, a queue 303, and a timer 304. In a first step (step 400), a web page 305 (for example, HTML or XML) is loaded into browser 301. Web page 305 is received with or contains a script 306. In one embodiment, a viewer uses browser 301 to locate, retrieve and view web page 305. The HTML or XML code for web page 305 is retrieved from server 307 and is transferred via a packet-switched network 308 (for example, the Internet) to receiver unit 300. Browser 301 renders the HTML or XML code of web page 305 on the screen of a television used by receiver unit 300 as a display device. In some embodiments, receiver unit 300 is coupled via a cable modem to a cable television network and web page 305 is received via this cable television network.

In other embodiments, web page 305 is not received from packet-switched network 308, but rather is transmitted to receiver unit 300 via a one-way broadcast communication channel such as a terrestrial airwave broadcast television communication channel or a one-way satellite broadcast television communication channel. Web page 305 may be transmitted in the teletext sub-channel over vertical blanking lines (VBI) lines 10–20 of a one-way NTSC broadcast television communication channel in accordance with: 1) NABTS ("teletext") standard EIA-516; 2) the IPVBI draft of February 1999 entitled "The Transmission of IP Over the Vertical Interval of a Television Signal" that describes how to decode IP packets from VBI lines 10–20; and 3) the Advanced Television Enhancement Forum Specification (ATVEF) Draft Version 1.1, revision 26 specification (the entire content of these three documents is incorporated herein by reference).

Next (step 401), script 306 is interpreted by browser 301 and begins executing on the receiver unit in the context of web page 305. Script 306 may be a small JavaScript fragment. Script 306 queries browser 301 for the browser's capability by inspecting a navigator object.

If script 306 determines that browser 301 has deferrer functionality, then processing proceeds to step 402. The user interacts with web page 305 (step 402) via script 306 and/or input tags in form area 309. The viewer enters user information (for example, via HTML form tag fields) that will be sent in a deferred request. Script 306 then calls a "defer" method on deferrer object 302 so that deferrer object 302 creates a deferred request (a second communication) in the form of a URL (step 403). The destination address of the URL in this example identifies a Common Gateway Interface (CGI) program 311 on server 307. In some embodiments, the destination address (destination URL) that is supplied by script 306 is hardcoded into the script 306 whereas in other embodiments script 306 generates the destination address (destination URL) using an algorithm.

Next (step 404), script 306 calls the "defer" method on deferrer object 302 and the "defer" method returns (step 405) a request identifier (request ID) that identifies the queued request. Next (step 406), in response to the script invocation of the "defer" method, the deferrer object 302 places one or more elements indicative of the request in the queue 303. In one embodiment, the complete URL request itself 303A is placed in queue 303 along with the request ID 303B, a request time 303C, an expiration date (not shown in FIG. 6), and a status code 303D indicating the current status of the request. Request time 303C can indicate a date and/or time after which the deferred request (the second communication) should be sent, or it can indicate an amount of time to wait until sending or attempting to send the request. Alternatively, request time 303C is a date and/or time or amount of time after which the deferred request should be sent or attempted. In one embodiment, the URL request itself is stored elsewhere (not in queue 303) on receiver unit 300 in association with request ID 303B and request ID 303B is stored in queue 303 such that the request ID can later be recovered from queue 303 and be used to retrieve the request URL.

Next (step 407), script 306 periodically checks the status of the request by periodically calling a "status" method on deferrer object 302. Browser 301 does not send the request, but rather waits (step 408) until it has determined, based on request time 303C and/or expiration date, that the request is to be sent. In this example, the request time 303C is a date and time after which the request is to be sent. Browser 301 therefore checks timer 304 and determines whether the current time kept by time 304 exceeds request time 303C.

After the waiting step (the current time from timer 304 exceeds request time 303C), browser 301 connects (step 409) to network 308 and retrieves the deferred request URL 303A (step 410) from queue 303. Browser 301 then sends (step 411) the deferred request URL 303A (the second communication) to the destination specified in the URL as an HTTP request 310. The user-entered information is encoded into the URL. In the illustrated example of FIG. 6, the request URL 303A is sent as HTTP request 310 to a Common Gateway Interface (CGI) program 311 on server 307. Below is an example of a URL having credit card information encoded into it:

<http://www.nbc.com/saleorder/deferred?ccnum=41280001>

The first part of this URL, "http:", indicates the protocol used. The second part "www.nbc.com" indicates the host where the CGI program 311 resides. The third part "saleorder/deferred" indicates the path on the host to the CGI program 311. The fourth part is a parameter that contains user information. In this example, the parameter "ccnum=41280001" contains the credit card number.

CGI program 311 on server 307 responds by placing the user information from the URL in a data base 313 on server 307 and by sending an HTTP response 312 (a third communication) back to the receiver unit 300 along with an HTTP status code. In the case where web page 305 is an order form supplied by or at the request of a merchant to a potential customer, data base 313 may be accessed by the merchant so that the user information stored there can be used to fill the order. Browser 301 receives HTTP response 312 (the third communication) with the status code (step 412), updates the status code information 303D for request 310 in queue 303 (step 413), and stores response 312 in queue 303 as response 303E. In some embodiments, response 303E includes a order confirmation number. This order confirmation number may be displayed on the receiver unit.

Script 306 periodically calls the "status" method on deferrer object 302 to query deferrer object 302 (step 414) on the status of the request designated by request ID 303B. If the returned status code indicates that a response has not been received for request 310 (step 415), then processing returns to step 414 where the query is made again.

If, on the other hand, the returned status code indicates that a response was received for request 310 (step 415), then processing proceeds to step 416. If the status code is an error code (for example, 4XX or 5XX series status code), then some feedback may be presented to the viewer by script 306 to indicate this status. Errors may be due to remote server 307 not being available via the network 308, server overload, a misconfiguration or bug on server 307, or other network communication problem. If the status code indicates that the request has not completed (for example, 1XX status code), then script 306 may also present this to the viewer. In one embodiment, the viewer has the opportunity to review deferred requests that are queued through some part of the interface of browser 301 (for example, the email "out-box") and optionally delete them.

If the status code indicates request 310 (the second communication) was properly received (for example, "200 OK" status code), then script 306 calls a "response" method on deferred object 302 to retrieve response content (step 416) and browser 301 displays the response content to the viewer. In embodiments where the viewer can use the email "out-box" to view queued deferred requests as described above, the viewer can be disconnected from the network for a period of time, reconnect, and then view the "response" content using the interface of browser 301 (for example, the email "in-box"). Such "response" content may include order confirmation numbers received from merchants in response to their having received orders for items in the form of deferred requests from the receiver unit.

After the HTTP response 312 has been received and the response content displayed, browser 301 calls the "remove" method on deferrer object 302 to clear request 310 (step 417) from queue 303. Methods of the deferred object in accordance with one embodiment are described below:

DEFER(URL, NAME, WHEN, EXPIRES). This method defers a request for a given URL for deferred submission. The NAME parameter is a human-readable string which may be displayed by the receiver unit when showing deferred requests. The WHEN parameter is the requested date/time for the deferred request to be sent. A value of zero indicates that the request should be made as soon as possible. The EXPIRES parameter indicates the expiration date/time of the request. After this time, the request and subsequent response will expire. A value of zero indicates "as long as possible". The defer method returns a unique and opaque request ID. This request ID is typically a hash of the URL, time of day, and a random number. A response of a negative number indicates that the request was not deferred because of some error and the value of the number indicates the type of error. An error response of negative one indicates that the request was not queued due to insufficient storage space available.

STATUS(REQUEST ID). This method returns a response status code. The response status codes are the same as HTTP response codes. Some of the status codes include the following. "100 Continue": The queued item is sill in the queue or a response has not been received from the requested server. "200 OK": The queued item has successfully been requested, and a response has been returned. "202 Accepted": The request has been accepted for processing but the processing has not been completed. "204 No Content": The queued request has been successfully requested and no response was returned. "400 Bad Request": The request could not be understood by the server due to malformed syntax. "401 Unauthorized": The request failed because it requires user authentication. "403 Forbidden": The server understood the request, but is refusing to fulfill it. "404 Not Found": The server has not found anything matching the Request-URI. "5XX errors": Server errors (5XX errors) are also valid.

RESPONSE(REQUEST ID). This method returns the content of the response from the server as a string.

RESPONSETYPE(REQUEST ID). This method returns the content-type of the response from the server as a string.

REMOVE(REQUEST ID). This method removes the request identified by the request ID from the queue.

URL(REQUEST ID). This method returns the URL for a given queued request as a string.

WHEN(REQUEST ID). This method returns the scheduled time for given queued request.

EXPIRES(REQUEST ID). This method returns the expiration date of the request. This expiration date may be shorter than the date requested by the caller to the defer method, due to client queuing limitations.

The deferrer object also has the property NEXTCONNECT. This property returns the scheduled time for the next connection time for queue clearance. A zero indicates immediate connection available (i.e., already connected).

EXAMPLE

The following example illustrates a use of a deferrer object in a web page. The page asks the viewer to vote for or against cheese. When the viewer clicks on an image, the client defers the viewer's vote and displays an alert.

```
<html>
<head><title>Your feedback</title></head>
<body>
<object type="application/deferrer" name=deferrer>
</object>
<script>
function DeferVote(myvolte)
{
if (myvote = "yes")
    deferrer.defer("http://voting.com.askmelater?myvote=1", "You voted yes.", 0, 0);
else
    deferrer.defer("http://voting.com.askmelater?myvote=0", "You voted no.", 0, 0);
}
alert ("Thank you for your vote!");
</script>
<H1>VOTE NOW!</H1>
<P>Are you in favor of cheese?
<P><a href="javascript:DeferVote("yes")><img src="yes.gif"></a>
<a href="javascript:DeferVote("no")><img src="no.gif"></a>
```

-continued

```
</body>
</html>
```

A somewhat more sophisticated implementation may have a pleasing graphical user interface and might do error checking, discovery of connection capability, and detect deferrer functionality.

Although the present invention is described in connection with certain specific embodiments for instructional purposes, the present invention is not limited thereto. A browser outside the interactive television context that does not respond to triggers but that is nonetheless capable of queuing and sending deferred requests is taught. The invention is not limited to the interactive television context, but rather applies more broadly to browsers in general and/or to email programs in general. In the interactive television context a receiver unit is illustrated in connection with a set-top box implementation, but it is to be understood that the receiver unit can be integrated into a television set or can be realized on a personal computer where the personal computer monitor screen serves as the display device of the receiver unit. In some embodiments, the receiver unit is not connected to a packet-switched network during some or all of the time the request is deferred but rather connects to send the deferred request. In other embodiments, the receiver unit is connected to the packet-switched network throughout the time the request is deferred but the receiver unit waits to send the deferred request. In some embodiments, the communication giving rise to the request need not contain any special script or scheduling information that controls the deferring of the request, rather the browser simply defers the request under certain predetermined circumstances. The browser of a receiver unit can, for example, automatically defer a request a random amount of time if the request contains user information entered in response to a form, but will not defer requests containing other types of information. Alternatively, a browser can automatically defer a request that contains user information entered in response to a form until the next time the receiver unit is connected to the packet-switched network. A browser can automatically defer a request for resending if an initial attempt to send the request is determined to have failed. Deferrer capabilities of a browser may be user controllable. Software that carries out steps of methods in accordance with the present invention can be stored on a computer-readable medium. Examples of computer-readable mediums include magnetic and optical storage media and semiconductor memory. Although the specific embodiment described above involves the ordering of an item, deferred requests in accordance with the invention are usable in voting and surveys applications ("Tell us if you like this program") and in registration/sign-up applications ("Tell us if you'd like more information"). Rather than delaying the sending of requests in response to a broadcast first communication to spread out the receipt of the requests by a remote server, the display of queries on the receiver unit due to the broadcast first communication can be spread out over time so that associated requests that are later sent to the remote server are similarly spread out over time. Triggers used in embodiments of the invention can be triggers that identify templates as set forth in U.S. patent application Ser. No. 09/345,223, entitled "Methods And Apparatus For Broadcasting Interactive Advertising Using Remote Advertising Templates", by Blackketter, et al., filed Jun. 30, 1999 (the subject matter of which is incorporated herein by reference).

Accordingly, various modifications, adaptations, and combinations of various features of the described embodiments can be practiced without departing from the scope of the invention as set forth in the claims.

What is claimed is:

1. In a computer network which interconnects a plurality of servers and a plurality of receiver units, wherein the plurality of receiver units are capable of sending requests to a plurality of destinations for processing, a method of controlling and scheduling when a request is sent to a destination, comprising:

receiving at a receiver unit a first communication that includes (i) scheduling information for determining when a request associated with the first communication should be sent to a destination for processing, the scheduling information being under the control of an author of the first communication and being capable of differing from one receiver unit to another, and (ii) an indication of the destination to receive and process the request associated with the first communication;

preparing the request to be processed by the destination and storing the request at the receiver unit;

at the receiver unit waiting a period of time determined by the scheduling information before attempting to the send the request to the destination; and after the period of time, automatically sending the request to the destination for processing.

2. The method of claim 1, wherein the first communication is a broadcast trigger, the broadcast trigger being received by the receiver unit from a one-way broadcast communication channel.

3. The method of claim 1, wherein the receiver unit is not connected to a network for accessing the destination during at least a portion of time while the receiver unit prepares and stores the request and waits to send the request.

4. The method of claim 3, wherein the receiver unit automatically establishes a connection to the network and sends the request to the destination without human input.

5. The method of claim 1, wherein the scheduling information comprises an indication that the request can be sent at a later time.

6. The method of claim 1, wherein the scheduling information comprises a time.

7. The method of claim 6, wherein the time is a time after which the request will not be sent to the destination by the television receiver unit.

8. The method of claim 1, wherein the scheduling information comprises a date.

9. The method of claim 8, wherein the date is an expiration date after which the request will not be sent to the destination by the receiver unit.

10. The method of claim 1, wherein the destination is identified by a Uniform Resource Locator (URL).

11. The method of claim 1, wherein the request comprises a Uniform Resource Locator (URL).

12. The method of claim 1, wherein the scheduling information comprises a script.

13. The method of claim 12, wherein the receiver unit includes a browser, the browser including a deferrer object and a queue, the method further comprising the script calling a method on the deferrer object such that the request is placed in the queue.

14. The method of claim 13, wherein the browser uses information stored in the queue to determine when to send the request to the destination.

15. The method of claim 13, further comprising:
receiving on the receiver unit a second communication from the destination; and
removing the request from the queue in response to the second communication.

16. A method as recited in claim 12, wherein the script includes random functionality so that the scheduling information produces a random period of time to wait.

17. The method of claim 1, further comprising:
receiving on the receiver unit an indication from the destination that the destination received the request; and
displaying at least a portion of the indication that the destination received the request.

18. The method of claim 17, wherein the indication that the destination received the request comprises a confirmation number.

19. The method of claim 1, wherein the request comprises information entered by a user of the receiver unit.

20. The method of claim 1, wherein the first communication is received at the receiver unit from a packet-switched network.

21. The method of claim 1 wherein the request comprises an electronic order.

22. In a computer network which interconnects a plurality of servers and a plurality of receiver units, wherein the receiver units are capable of sending requests to a plurality of destinations for processing, a method of controlling and scheduling when a request is sent to a destination, comprising:
identifying one or more destinations for receiving requests from the plurality of receiver units;
generating scheduling information that indicates a destination for receiving requests and that determines when the receiver units should send requests to the destination, the scheduling information producing different results as between at least some of the receiver units that receive the scheduling information;
creating a first communication that associates the scheduling information with a particular request, thereby allowing the author of the first communication to control the scheduling information that is associated with the particular request and determine when the particular request should be sent; and
distributing the first communication to the plurality of the receiver units so that the receiver units receiving the first communication may send requests according to the scheduling information provided by the first communication.

23. The method of claim 22 wherein the scheduling information is in the form of a script that is either part of a broadcast trigger, a web page or an attachment to a web page.

24. The method of claim 22, wherein the scheduling information comprises a script to be executed by the receiver units, the method further comprising including random functionality in the script so that the scheduling information at each of the receiver units executing the script produces a random period of time to wait prior to initiating the particular electronic transaction.

25. The method of claim 22 wherein the destination in the scheduling information is identified by a Uniform Resource Locator (URL).

26. For a computer network which interconnects a plurality of servers and a plurality of receiver units, wherein the receiver units are capable of sending requests to a plurality of destinations for processing, a computer program product comprising a computer readable medium carrying computer-executable instructions that implement a method of controlling and scheduling when a request is sent from a receiver unit to a destination, the method comprising:
receiving at a receiver unit a first communication that includes (i) scheduling information for determining when a request associated with the first communication should be sent for processing, the scheduling information being under the control of an author of the first communication and being capable of differing from one receiver unit to another, and (ii) an indication of a destination to receive and process the request associated with the first communication;
preparing the request to be processed by the destination and storing the request at the receiver unit;
at the receiver unit waiting a period of time determined by the scheduling information before attempting to the send the request to the destination; and
after the period of time, automatically sending the request to the destination for processing.

27. The computer program product of claim 26, wherein the receiver unit is connected to a network, and wherein the method further comprises disconnecting the receiver unit from the network during the period of time.

28. The computer program product of claim 26, wherein storing the request comprises placing the request in a queue.

29. The computer program product of claim 28 wherein the method further comprises:
receiving on the receiver unit, an indication from the destination that the destination received the request; and
removing the request from the queue in response to the indication that the destination received the request.

30. The computer program product of claim 26, wherein the method further comprises incorporating information entered by a user of the receiver unit into the request.

31. For a computer network which interconnects a plurality of servers and a plurality of receiver units, wherein the receiver units are capable of sending requests to a plurality of destinations for processing, a computer program product comprising a computer readable medium for carrying computer-executable instructions that implement a method of controlling and scheduling when a request is sent from a receiver unit to a destination for processing, the method comprising:
identifying one or more destinations for receiving requests from the plurality of receiver units;
providing scheduling information that indicates a destination for receiving requests and that determines when the receiver units should send requests to the destination, the scheduling information producing different results as between at least some of the receiver units that receive the scheduling information;

creating a first communication that associates the scheduling information with a particular request, thereby allowing the author of the first communication to control the scheduling information that is associated with the particular request and determine when the particular request should be sent; and distributing the first communication to the plurality of the receiver units so that the receiver units receiving the first communication may send requests according to the scheduling information provided by the first communication.

32. The computer program product of claim 31, wherein the scheduling information is in the form of a script that is either part of a broadcast trigger, a web page, or an attachment to a web page.

33. The computer program product of claim 31, wherein the method further comprises including random functionality in the scheduling information so that each of the interactive television receiver units using the scheduling information produces a random period of time to wait prior to initiating the particular electronic transaction.

* * * * *

UNITED STATES PATENT AND TRADEMARK OFFICE
CERTIFICATE OF CORRECTION

PATENT NO. : 6,966,066 B1
APPLICATION NO. : 10/029055
DATED : November 15, 2005
INVENTOR(S) : Daniel J. Zigmond et al.

It is certified that error appears in the above-identified patent and that said Letters Patent is hereby corrected as shown below:

In column 1, line 56, delete "<FORM>" and insert -- </FORM> --, therefor.

In column 8, line 12 (Programming), delete "("http://voting.com.askmelater" and insert -- ("http://voting.com/askmelater --, therefor.

Signed and Sealed this

Twenty-ninth Day of September, 2009

David J. Kappos
*Director of the United States Patent and Trademark Office*